Aug. 3, 1965  G. KNIPPERS ETAL  3,198,720
METHOD OF DETINNING TIN-PLATE
Filed May 23, 1960

INVENTORS:
GUSTAV KNIPPERS
JOHANN CHRISTIAN GRÖBER
BY:

3,198,720
METHOD OF DETINNING TIN-PLATE
Gustav Knippers, Auf dem Saarnberg 18, Mulheim an der Ruhr Saarn, Germany, and Johann Christian Gröber, Mulheim an der Ruhr, Germany; said Gröber assignor to said Knippers
Filed May 23, 1960, Ser. No. 31,081
Claims priority, application Germany, May 23, 1959, K 37,820
9 Claims. (Cl. 204—121)

The invention relates to a method for the recovery of the tin contained in tin plate and more particularly to a method for the recovery of the tin contained in scrap tin-plate of any kind such as used cans and the like which may be taken from the refused dust.

An object of this invention is to provide an improved method of an device for recovering the tin contained in scrap tin-plate of any kind.

A further object of this invention is to provide an improved method for recovering the tin contained in scrap tin-plate of any kind including such as used cans provided with a protective coating layer or covered with adhesive material for labels and the like.

Another object of this invention relates to a method for the recovery of the tin contained in scrap tin-plate which enables the scrap to be treated directly in the state of pressed blocks, such as blocks having been pressed in order to facilitate preceding transportation of the scrap.

Yet another object of this invention relates to the provision of a new and improved method of recovering the tin contained in scrap tin-plate of any kind in a simple and economical manner.

In accordance with the main features of this invention there is provided an improved method of recovering the tin contained in scrap tin-plate of any kind wherein the scrap tin-plate is treated in an electrolyte which contains an aliphatic alcohol with at most three carbon atoms, and the tin deposited on the cathode is melted under reducing conditions, and casted if wanted.

Another feature resides in the provision of an improved method of recovering the tin contained in scrap tin-plate of any kind wherein the scrap tin-plate is treated in an electrolyte which contains an aliphatic alcohol with at most three carbon atoms, water, and an alkali carbonate, and the tin deposited on the cathode is melted, under reducing conditions, and casted if wanted.

Other objects, features and advantages of this invention will more fully appear from the following detailed description taken in connection with the accompanying drawings.

Methods are known for the detinning by electrolysis in alkaline solutions, especially in 60° to 70° C. warm 9% caustic soda solution with a cell output of 1.5 volts and 1500 amperes. These known electrolytic treatments have been replaced in practice by the chlorine detinning process according to Goldschmidt since they have various disadvantages. They operate with a relatively high current consumption and also carbonate formation occurs since the alkali hydroxide present in aqueous solution reacts with the carbon dioxide of the surrounding air. The presence of carbonates in the known methods has also provide very disadvantageous so that the baths lose their effect after a relatively short time. Moreover, the tin scum which forms on the cathode melts with considerable difficulty.

It has now been found that these disadvantages can be avoided if the scrap tin-plate is treated in an electrolyte which contains organic liquids miscible with water, preferably lower alcohols with at most three carbon atoms.

It has been found particularly suitable to use methanol as the alcohol and to add this is an amount of 5 to 20% by volume. In order to increase the conductivity of the bath liquid, alkali in an amount of about 35 to 45 grams per litre of bath fluid calculated as $Na_2O$ is perferably added thereto. Surprisingly it has been found that the alkali must be never be added in the form of alkali hydroxide as in the previous method; however, it is possible and generally satisfactory to use the cheaper carbonates, e.g., soda or potash.

A satisfactory cell temperature would be obtained at about 80° C. and the output of the cells should advantageously have a current strength of at least 2500 amperes and a cell potential of about 2.8 to 3.0 volts.

The tin deposited as a spongy mass on the cathode is subsequently melted under reducing conditions and cast in a oxygen-free atmosphere.

In contrast to all previously known detinning methods, the scrap tin-plate can be directly treated as blocks in the pressed state. It is no longer necessary, as was always the case before, to have ruptured the scrap which, in order to facilitate preceding transportation will always be pressed into blocks, which conventional rupture operation means a troublesome separate and additional working step. Moreover it is suitable to subject pressed scrap tin-plate before electrolysis to a vacuum pre-treatment in such a way that it is introduced into a vacuum container filled with a liquid approximately corresponding to the electrolyte fluid, preferably subjected to a vacuum of about 60 mm. Hg and finally the vaucuum discontinued. The air contained in the small hollow spaces inside the blocks is thus removed therefrom and the spaces are filled with the electrolyte fluid. In this way, the tin layers on the squashed inner walls are reliably dissolved during the subsequent electrolysis.

The tin deposited on the cathode is melted at a temperature between 1100° and 1150° C., advantageously in a continuously operating rotary drum melting oven and in order to avoid oxidation with atmospheric oxygen, it is preferably protected from attack of the oxygen by running off the tin flow from the melting oven with a neutral gas, e.g., by blowing through nitrogen.

According to the method of the invention, in particular used cans which are collected on a refuse tip are detinned. The iron residues have a residual tin content which amounts to only half that which was possible with the most careful detinning according to the chlorine gas method. In the chlorine gas or chlorine detinning method, the dry chlorine gas acts on the dry scrap tin-plate in large tightly closed reaction chambers. The tin is thus converted into fluid tin tetrachloride $SnCl_4$. The iron of the tin-plate remains unaffected if the reaction temperature is held below about 3° C. The value mentioned obtained by the invention holds for all kinds of strongly hydraulically compressed can blocks, whereas in the known chlorine gas method, it was only possible to detain loose scrap tin-plate or cans. Apart from the fact that the known chlorine detinning method has an essentially higher technical consumption than the method applied for, it only partially detins scrap tin-plate coated with a protective layer, since the chlorine can only partly attack the tin layer lying under the protective coating. Moreover, the $SnCl_4$ formed under the action of the chlorine, since it is obtained as a water-free liquid, cannot be entirely removed from the inner hollow spaces of the used cans, e.g., from milk cans or fruit juice cans which during their consumption are provided generally with only one or two small holes in the cover. There is thus a loss of tin which would otherwise in later foundry use of the detinned scrap plate operate quite unsatisfactorily for example as steel scrap in Siemens-Martin furnaces. This proportion of tin in the steel scrap can cause the rolling properties or the deep drawing properties of plate produced from the tin-containing steel to rise to unacceptable limits. A further disadvantage is that chlorine gas residues and dissociated tin chloride act to disintegrate the detinned plate blocks by acid formation. The blocks cannot therefore be stored and they disintegrate after a short time such as by scaling so that they must be used up very rapidly.

Comparative investigations on the detinning efficiency according to the chlorine detinning method and the method of the invention have been carried out by means of boring tests in the pressed blocks. From the cuttings the residual tin content from the tests on the pressed pieces of the blocks of detinned scrap plate according to the method of the invention amounts to 0.24%, whereas the scrap sheet detinned as loose scrap according to the chlorine detinning process and subsequently pressed into blocks had a residual tin content of 0.47 to 0.49%. By substitution of only lightly pressed blocks, namely, those which have been manufactured in the press at about 150 atms., in the method of the invention, the residual tin content even sank to 0.18%. Furthermore, the test pieces treated according to the chlorine detinning method consisted of unpressed scrap from can manufacture, whereas the method of the invention was carried out with used cans pressed before detinning, in which the residual tin, even that present in the solder, would be fixed more easily, so that the better result should be expected with the unpressed scrap. In tests in which completely similar materials were used, quite a more advantageous ration of the detinning efficiencies of the known method and the method according to the invention was obtained.

The method according to the invention is also technically superior to the known electrolytic methods which are less technically advantageous than the known chlorine detinning process. In particular, the scrap tin-plate covered with protective coatings has not previously been detinned since the coatings prevented the attack of the electrolyte. In the new method according to the invention, operating on an electrolytic base with the modified bath liquid as well as with the current supply ratio in the bath, effects are obtained such that the detinning can be carried out substantially more completely than previously.

The bath liquid based upon an aqueous alcohol solution preferably of lower alcohols is responsible for increasing the conductivity with alkali hydroxides or alkali carbonates. Methyl, ethyl and propyl alcohol are preferably used as lower alcohols, particularly methyl alcohol used in crude technical form. The addition amounts, according to the particular kind of material to be detinned, to approximately 5 to 20%, e.g., alkali carbonates are used in the amounts of 5% potash and 10% soda. In their place, the hydroxides can also be used. The methanol used has the property of making lacquer layers, which cover the inside of the cans or the scrap sheet, movable for removal of the tin. Adhesive materials for labelling the cans are also dissolved so that the detinning can be reliably carried out at these places also.

The fact that alkali carbonates can be used contrasts particularly with the statements which have been made previously in tin chemistry literature. The electrolysis of tin coatings of iron plate is, according to prior literature, so carried out that alkali hydroxides dissolve the tin in the form of stannates and the tin is electrolytically deposited from these, so that it was previously considered that carbonates which are of advantage since they are technically cheaper and chemically more stable would disturb the electrolysis of the tin. In fact, it has now surprisingly been found that with the use of carbonates, the detinning according to the method of the invention can be carried out satisfactorily. The technical conditions are not sufficiently clear. It has been determined that the detinning capacity of the bath decreases strongly if the addition of methyl alcohol is too small. There is a tendency to consider the process as one in which the carbonates together with a small hydrolytic action are de-composed by the current, and that the number of OH-ions is increased, i.e., that a conversion of the carbonates into hydroxides is effected. Analysis of the bath fluid which is determined for its $CO_2$ content cannot confirm this assumption. The electrolytic detinning method previously failed in that the alkali hydroxide used lost its effect by taking up $CO_2$ from the air. Consequently in the method of the invention, the bath liquid has operated without renewal for much longer than half a year in day and night operation and shows substantially no alteration in this respect in its detinning capacity.

A further difference consists in the appearance of the detinned plate. In the absence of methanol, the scrap iron plate has a blue-grey appearance as if the iron plate has been annealed. It thus appears that this plate has been oxidized by the oxygen occurring at the anode. In the presence of methanol in the bath, a specular steel gloss is given to the plates so that this could be falsely assumed to be stainless steel. Traces of an oxidation of the iron plate covering were not observed.

The bath liquid is preferably held constant at about 80° C. In order to maintain as small as possible the diluting and/or vaporizing losses of the methanol, the baths are advantageously provided with condensers which are cooled with water so that the condensed liquid is returned to the bath.

The inventive process will now be described by a specific example, it being understood, however, that this example is given by way of illustration and not by way of limitation, and that many changes may be effected without in any way affecting the scope and spirit of this invention as recited in the appended claims.

*Example*

The raw material for the detinning process to be described consisted of tin plate scrap collected from refuse dumps. This scrap was made up from uncleaned cans of the usual kind, i.e., the cans were varnish or lacquer coated and had still attached thereto labels, printing legends and the like. The cans were compacted into parcels or blocks and the thus compacted parcels were inserted into an anode basket. The anode basket with the scrap parcels therein was thereafter suspended in an electrolytic bath which in turn was contained in a vacuum vessel. The electrolyte in the bath consisted of an aqueous solution of 5%, 10% sodium carbonate and 15% by volume of methanol, the remainder being water. The temperature of the electrolyte was about 70° C. The vacuum container was then subjected to subatmospheric pressure conditions of about 60 mm. Hg for such time as will result in an evacuation of the air contained in the spaces or interstices of the scrap parcels, so that upon reestablishing normal pressure conditions in the vacuum container, these interstices were filled with electrolyte. Thereafter, the anode basket with the scrap parcels was placed into an electrolysis container and connections to a direct current source were established, the anode basket constituting the anode while the electrolysis container, of course, was provided with a cathode. The electrolyte in the electrolysis container was of the same composition as hereinbefore defined. The temperature of the bath was about 70° C. The electrolysis was carried out with a minimum current strength of 2500 amperes and a cell potential of about 3 volts. After completed electrolysis, the anode basket with the scrap parcels was again subjected to a vacuum of about 60 mm. Hg for about 10 minutes. This resulted in removal of electrolyte from the interstices of the scrap parcels. The anode basket was thereafter emptied and the remaining scrap was subjected to analysis which indicated a tin residue of 0.24%. The tin was removed from the cathode and showed a purity of 99.2%.

It will, of course, be realized that the purity of the recovered tin is dependent on the raw material, that is the contaminations and other extraneous matter adhering to the cans, but generally varies between 96% and 99.5%.

The electrolysis container proper may be constructed as a vacuum container so that the pretreatment, i.e. the vacuum treatment prior to electrolysis referred to, may be carried out in the same electrolysis bath.

A detinning apparatus for carrying out the method according to the invention can advantageously consist of several, preferably two, detinning baths which for example have a lower curved furnace chamber and an iron bath container preferably arranged thereover. Each bath container contains a cathode constructed as a drum open above and below and an anode inserted in the cathode drum and constructed as a basket. To regulate the contact it is particularly advantageous to hold the cathode drum with three supporting arms displaced at 120° to which the contacts are soldered and which are supported on a flange welded to the upper edge of the bath container with an intermediate layer of, for example, hard paper as an insulation. The basket anode is then provided with 3 rectangular shaped eyelets likewise space at 120° and a copper disc is soldered to the lower edge of each. Catch members can engage in the eyelets which serve in turn for the current supply to the anode and also for holding the anode basket. The catch members for this purpose are preferably connected to the positive pole of the current source and are movably arranged in the insulating shell on the upper edge of the bath container. The anode basket is preferably provided with deflecting plates so that oxygen evolved is deflected away and an attack on the tin depositing at the cathode is avoided.

Preferred apparatus for carrying out the method according to the invention is described below in conjunction with the accompanying drawing in which.

Figure 1:
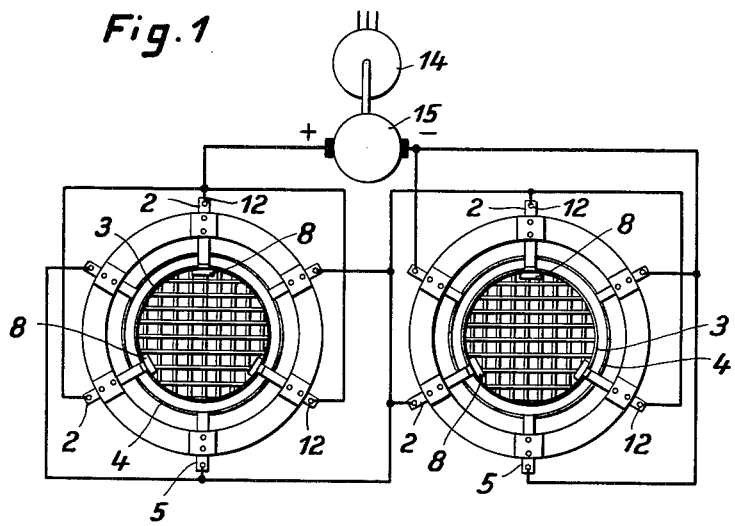
FIG. 1 shows a plan view of an apparatus with current supply consisting of two detinning baths.
Figure 2:
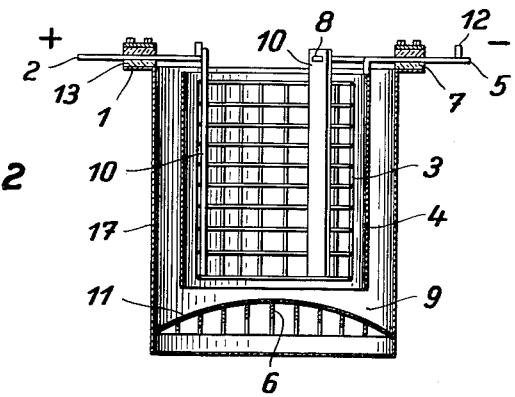
FIG. 2 shows a vertical section through a bath container with a cathode drum and basket anode.

As will be seen in FIG. 1, two bath containers are provided in the embodiment which are arranged adjacent one another and electrically connected in series. The bath containers themselves are constructed similarly. Their construction will be first explained with reference to FIG. 2. Each bath container consists of a cylindrical container 17 of steel with an inwardly curved base 11 on which outwardly projecting heat transfer ribs 6 are welded. The space 9 between the lower edge of the container 17 and the base 11 serves as a furnace space. On the upper edge of the container 17, a flange 1 is welded, on which the anode 3 and also the cathode 4 are supported. The cathode 4 is constructed in the form of an upwardly and downwardly open drum of steel plate. At its upper end, it includes three support arms 5 which are displaced by 120°. They preferably consist of rigid iron bars and are supported on the container flange 1 by way of an intermediate layer 7 of hard paper acting as an insulation. On each support arm 5, a copper bolt 12 is soldered by means of silver solder which serves as a current conductor.

The anode 3 is suspended concentrically in the inside of the drum-shaped cathode 4. For this purpose, each anode includes three eyelets 8 displaced by 120° which are constructed rectangularly and carry a copper bar 10 on their lower edge which is soldered to the whole flange. These eyelets 8 serve for suspending the anode basket in the bath and also as current conductors for the anode. For this purpose on the flange 1, three insulating bushings 13 consisting of hard paper are secured, in which longitudinally movable support members 2 are mounted which are connected with the current source. The three insulating bushings 13 displaced with respect to one another by 120° are displaced by 60° with respect to the three insulating shells 7 for the cathode support arms 5. To improve the current flow from the catch members 2 to the anode basket 3, the copper contacts can be amalgamed with mercury. The amalgam layer smooths out any small uneveness in the surface of the copper plate so that a high surface contact is ensured and impurities can be avoided by simply covering with a coating.

Figure 3A:
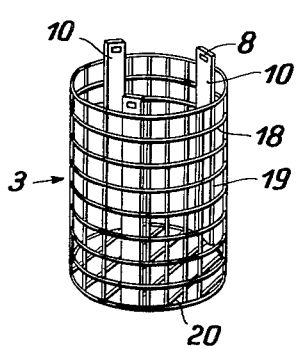
FIG. 3 shows perspective views of two forms of basket anode, namely, (a) without deflector plates, (b) with deflector plates in section.
Figure 3B:
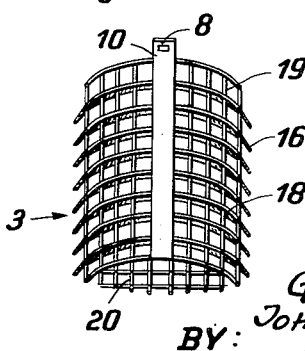

FIG. 3 shows perspectively two possible constructions for the anode. According to FIG. 3a, the anode basket is welded from rings 18 and bars 19 of bar or round iron. The base of the basket is made in the form of a grid from iron rods 20. In order to prevent passage of oxygen forming on the anode preferably at its inside to the tin layer depositing on the cathode it is preferable to provide the cover surface of the anode basket, as indicated in FIG. 3b, with funnel-shaped rings 16 which preferably somewhat overlap. The electrode resistance of the baskets is thus held sufficiently small in comparison with the detinning material.

FIG. 1 shows diagrammatically the electric circuit for two adjacently arranged bath containers of the kind described. The direct current generator 15 driven by a motor 14 is connected at its positive pole to the three catch members 2 on the basket anode 3 of the first bath container. The three support arms 5 of the cathode drum 4 of the first bath container are connected by conductors to the three catch members 2 of the basket anode of the second bath container, whereas three support arms 5 of the second bath container are connected to the negative pole of the generator 15.

In the embodiment, the container of the bath container 17 has a diameter of 1800 millimetres with a bath depth of 2000 millimetres. The cathode drum 4 has a diameter of 1700 millimetres and the basket anode 3 a diameter of 1350 millimetres. Both bath containers can preferably be heated by a common oil furnace fire. They are inserted for half their bath depth beneath the base surface and are covered on the outside with thick fireclay walls. Both containers can be held at the same temperature preferably about 80° C. with only slight fluctuations.

This apparatus with the dimensions given operates with a bath content of 3000 litres per container. The rotating generator 15 has a storage potential of 6 volts with a current strength of about 2500 amperes. The higher current strength is advantageous. The output of this plant, with a deposited amount of tin of about 130 kilograms per 24 hours of operation, corresponds to approximately the amounts theoretically available on the basis of the Faraday laws if the valence of the tin is assumed to be 4.

The tin is deposited as tin powder which is removed from the cathode with special scrapers and withdrawn from the bath. This tin sponge is then melted in a rotary oven with ammonium chloride and borax additions, which facilitate the reduction. It can be treated with a reducing flame without carbon addition or with a neutral flame with the addition of carbon in the form of anthracite or small coal. As a covering for the oven, a neutral material ($Al_2O_3 \cdot SiO_2$) is chosen. This material has the advantage that with continuous daily use of the oven a duration of about 4 years is obtained. From the continuously operating oven, the liquid tin is run off whereby it is protected as far as possible with a neutral gas against attack from atmospheric oxygen. The tin is cast from the casting label in block shapes of grey cast iron or chill moulded iron into blocks of about 2000 kilograms weight.

The tin so recovered has a purity of 99.2 to 99.4%.

The dimensions and values given in the examples serve merely for illustration and should not be taken as limiting the scope of the invention.

What we claim is:

1. A process of detinning tin plate scrap compacted into blocks, which comprises exhausting air from the interstices of said compacted blocks, filling the interstices with aqueous electrolyte containing about 5 to 20 percent by volume of an aliphatic alcohol having not more than three carbon atoms and about 35 to 40 grams per liter of electrolyte of an alkaline substance selected from the group consisting of alkali metal carbonates and alkali metal hydroxides, calculated as $Na_2O$, placing said blocks thereafter into an electrolytic bath of said electrolyte, said bath being exposed to the atmosphere and containing a cathode, anodically connecting said blocks to a direct current source, and electrolyzing at a temperature of about 60 to 80° C. with a current having a cell potential of about 2.8 to 3 volts, whereby tin will deposit on said cathode.

2. A process as claimed in claim 1, wherein said alkaline substance consists of about 5 percent by weight of potassium carbonate and about 10 percent by weight of sodium carbonate.

3. A process for the recovery of tin from tin plate scrap compacted into blocks, which comprises exhausting air from the interstices of said compacted blocks, filling the interstices with aqueous electrolyte containing about 5 to 20 percent by volume of an aliphatic alcohol having not more than three carbon atoms and about 35 to 40 grams per liter of electrolyte of an alkaline substance selected from the group consisting of alkali metal carbonates and alkali metal hydroxides, calculated as $Na_2O$, placing said blocks thereafter into an electrolytic bath of said electrolyte, said bath being exposed to the atmosphere and containing a cathode, anodically connecting said blocks to a direct current source, electrolyzing at a temperature of about 60 to 80° C. with a current having a cell potential of about 2.8 to 3 volts, whereby tin will deposit on said cathode, and melting said tin deposited on the cathode under reducing conditions for recovery of tin.

4. A process of detinning tin-plate scrap which comprises placing the scrap in an aqueous alkaline electrolytic bath exposed to the atmosphere and containing a cathode and in which said scrap forms the anode and depositing the tin upon said cathode by passage of an electric current through said bath containing 5 to 20% per volume of an aliphatic alcohol of not more than 3 carbon atoms and about 35 to 40 grams of alkali calculated as $Na_2O$ per liter of electrolytic bath.

5. A process of detinning tin-plate scrap which comprises compressing the tin-plate scrap into a block, placing the block in an aqueous alkaline electrolytic bath exposed to the atmosphere and containing a cathode, an anode formed by the block, 5 to 20% per volume of methyl alcohol and about 35 to 40 grams of alkali calculated as $Na_2O$ per liter electrolytic bath and depositing the tin upon said cathode by passage of an electric current through said bath.

6. A process of detinning tin-plate scrap which comprises compressing the tin-plate scrap into a block, placing the block in an aqueous alkaline electrolytic bath exposed to the atmosphere and containing a cathode and in which said block forms the anode and depositing the tin upon said cathode by passage of an electric current through said bath containing 5 to 20% per volume of an aliphatic alcohol of not more than 3 carbon atoms and about 35 to 40 grams of alkali calculated as $Na_2O$ per liter electrolytic bath.

7. A process of detinning tin-plate scrap which comprises compressing the tin-plate scrap into a block, placing the block in an aqueous alkaline electrolytic bath exposed to the atmosphere and containing a cathode and in which said block forms the anode exhausting the air entrapped in the interstices of said block thereby replacing said air in said interstices by liquid of said electrolytic bath containing 5 to 20% per volume of an aliphatic alcohol of not more than 3 carbon atoms and about 35 to 40 grams of alkali calculated as $Na_2O$ per liter electrolytic bath and depositing the tin upon said cathode by passage of an electric current through said bath.

8. A process of detinning tin-plate scrap which comprises compressing the tin-plate scrap into a block, placing the block in an aqueous electrolytic bath exposed to the atmosphere and containing a cathode, an anode formed by said block, an alkali selected from the group consisting of alkali metal carbonate and alkali metal hydroxide and 5 to 20% per volume of an aliphatic alcohol of not more than 3 carbon atoms and depositing the tin upon said cathode, said alkali being present in an amount corresopnding to about 35 to 40 grams calculated as $Na_2O$ per liter electrolytic bath.

9. A process of detinning tin-plate scrap which comprises compressing the tin-plate scrap into a block, placing the block in an aqueous electrolytic bath exposed to the atmosphere and containing a cathode, an anode formed by said block, about 5% by weight of potassium carbonate, about 10% by weight of sodium carbonate and 5 to 20% per volume of an aliphatic alcohol of not more than 3 carbon atoms and depositing the tin upon said cathode by passage of an electric current through said bath.

References Cited by the Examiner

UNITED STATES PATENTS

| | | | |
|---|---|---|---|
| 660,116 | 10/00 | Meyer | 204—122 |
| 1,452,573 | 4/23 | Simpkins | 204—54 |
| 1,471,469 | 10/23 | Kardos | 204—146 |
| 1,841,978 | 1/32 | Oplinger | 204—54.1 |
| 1,964,948 | 7/34 | Hibbard et al. | 204—120 |
| 2,094,632 | 10/37 | Betterton et al. | 204—120 |
| 2,156,427 | 5/39 | Cooper | 204—54 |
| 2,243,165 | 5/41 | Mandl | 204—121 |
| 2,436,010 | 2/48 | Lebedeff | 204—120 |
| 2,563,903 | 8/51 | Zadra | 204—272 |
| 2,856,344 | 10/58 | Lapham | 204—272 |

FOREIGN PATENTS 811,442  4/59  Great Britain.

OTHER REFERENCES

Mathers et al., "Tran. of the Am. Electrochemical Soc.," vol. XXXVIII, 1920, pp. 135–138.

WINSTON A. DOUGLAS, *Primary Examiner.*

JOHN R. SPECK, JOSEPH REBOLD, MURRAY TILLMAN, *Examiners.*